Feb. 17, 1970  H. SINCLAIR  3,495,403
HYDRAULIC TURBO COUPLINGS
Filed June 22, 1967  3 Sheets-Sheet 1

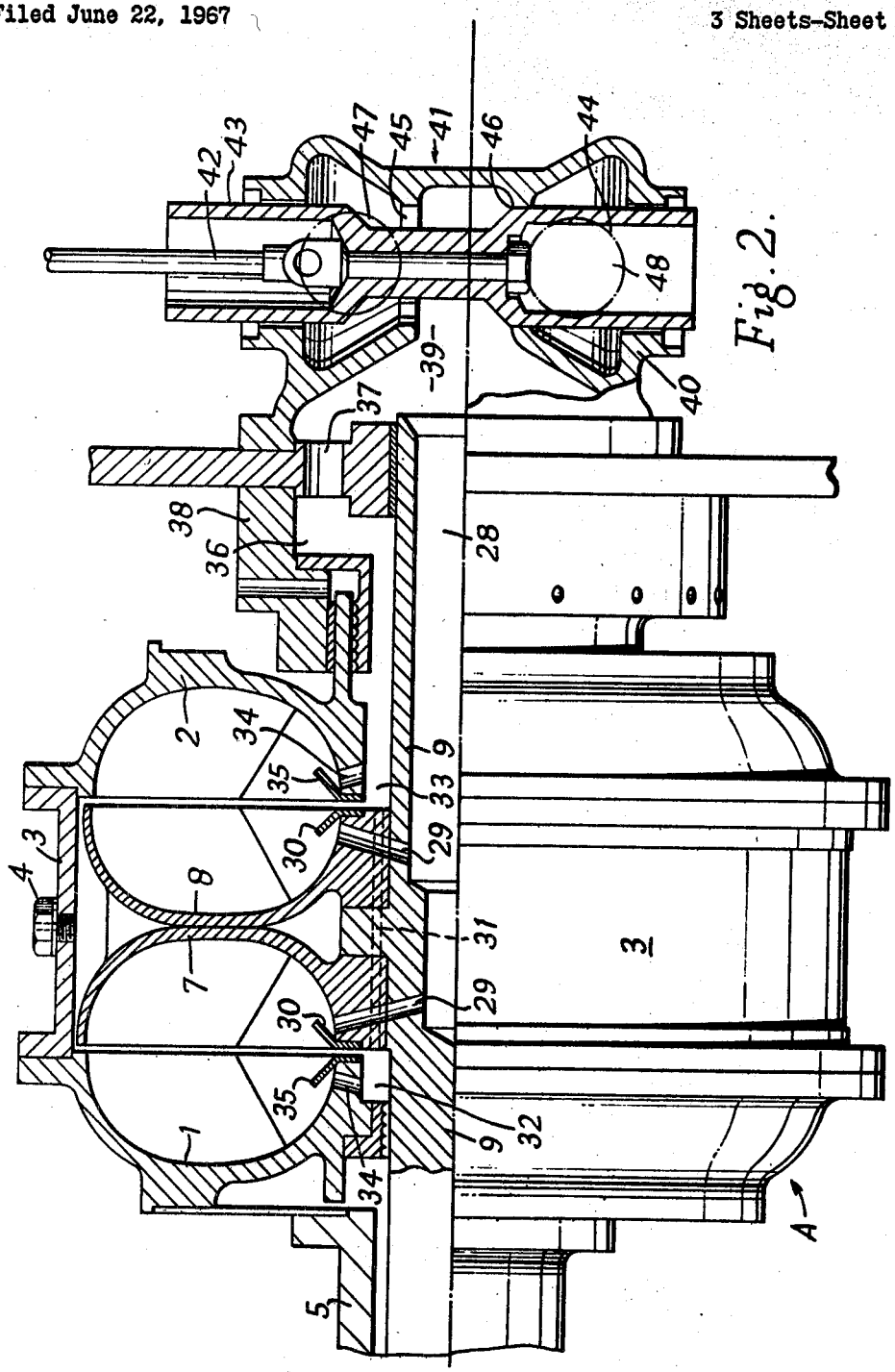

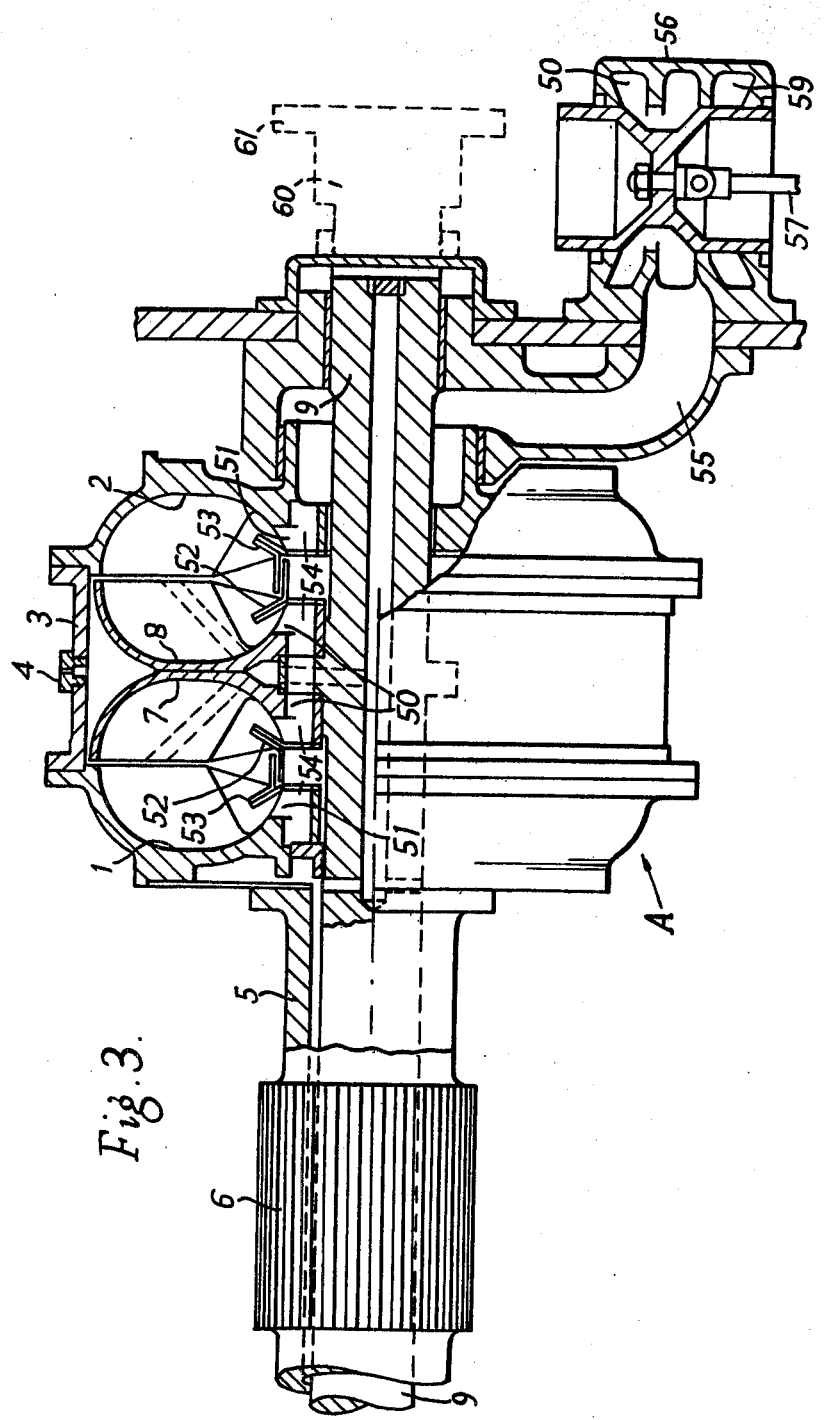

# United States Patent Office 3,495,403
Patented Feb. 17, 1970

3,495,403
HYDRAULIC TURBO COUPLINGS
Harold Sinclair, London, England, assignors, by mesne assignments, to Synchro-Drives Limited, London, England
Filed June 22, 1967, Ser. No. 648,085
Claims priority, application Great Britain, June 23, 1966, 28,230/66
Int. Cl. F16d 33/12; F16h 41/20
U.S. Cl. 60—54
12 Claims

ABSTRACT OF THE DISCLOSURE

A hydraulic turbo coupling having restricted leak-off nozzles for discharge of liquid from the working circuit, a supply duct for working liquid, and means operable to reduce the supply of liquid to the working circuit through said duct at least to the extent to enable the working circuit to empty by reversal of flow through said duct, in addition to emptying through said leak-off nozzles, when under working conditions of speed and torque creating sufficient back pressure within the working circuit to reverse the flow through said duct.

---

Figure 1:
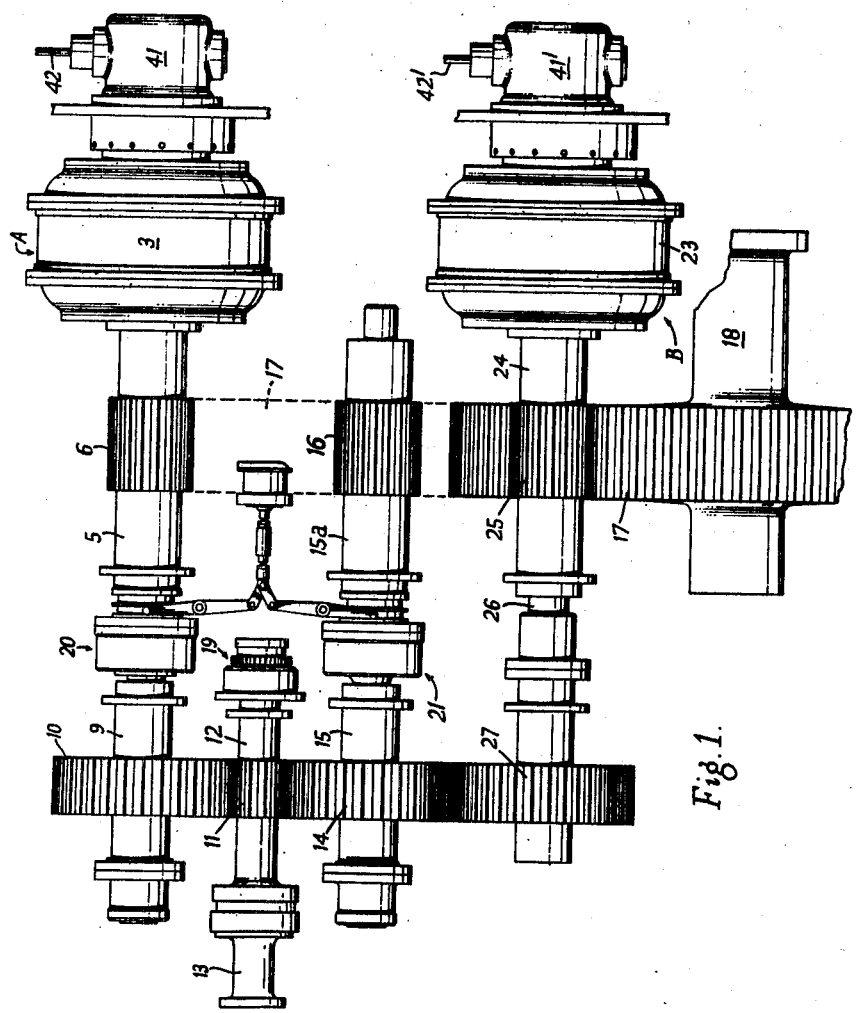

Two such turbo-couplings can be incorporated in ahead and astern gear trains of a marine reversing gear.

This invention relates to hydraulic turbo couplings of the type comprising at least one pair of vaned rotors that define a working circuit wherein during normal operation of the turbo coupling working liquid in the form of a vortex ring transmits power from one rotor to the other.

It is an object of the invention to provide a turbo coupling of the above type which is capable of rapid filling and emptying by novel means of simple and reliable construction particularly suitable for incorporation, in conjunction with another similar turbo coupling, in ahead and astern gear trains respectively in a marine reversing gear in order to effect manoeuvring of the vessel.

In accordance with the invention there is provided a hydraulic turbo coupling of the type comprising at least one pair of vaned rotors that define a working circuit wherein during normal operation of the turbo coupling working liquid in the form of a vortex ring transmits power from one of said rotors to the other, the improvement including at least one filling/emptying duct that opens into said working circuit in a region closely adjacent the inner profile radius of said working circuit, and valve means operable to connect said duct selectively to a source of working liquid whereby to supply liquid to said working circuit via said duct or to connect said duct to exhaust to enable said working circuit to empty by reversal of flow through said duct when under working conditions of speed and torque creating sufficient pressure within the afore-mentioned region of said working circuit to effect said reversal of flow.

Opening of the said duct into the working circuit in a region closely adjacent the inner profile radius of the working circuit takes advantage of the back pressure created by the liquid vortex flow in that region under the aforementioned conditions of speed and torque of the turbo coupling.

In order to assist the emptying of the working circuit under the above-mentioned conditions, flow directing or diverting means are preferably provided for directing or diverting liquid from the working circuit towards said filling emptying duct under the said working conditions. Where, as is preferred, a plurality of ducts are provided for filling and emptying the working circuit, individual flow directing or diverting means may be provided in association with the respective ducts suitably located near the inner profile radius of the working circuit.

In a marine reversing gear wherein the ahead and astern gear trains each incorporate a hydraulic turbo coupling according to the invention the ahead and astern turbo couplings are always in a geared relationship such that when in operation with both turbo couplings at least partially filled the torque of one coupling is in opposition to the torque of the other coupling such that the requisite working conditions of speed and torque are created to empty the selected working circuit at least partially through said duct.

In the accompanying drawings, FIGURE 1 is a plan view of a marine turbine driven reversing gear in accordance with an embodiment of the invention, in which the ahead and astern gear trains each incorporate a double circuit hydraulic turbo coupling, FIGURE 2 is a part sectional side view, on a larger scale than FIGURE 1, of the ahead turbo coupling of FIGURE 1 and the associated control valve, and FIGURE 3 illustrates a modification of the marine reversing gear shown in FIGURES 1 and 2.

Referring to FIGURES 1 and 2, the turbo coupling A in the ahead train comprises a pair of vaned rotors 1 and 2 interconnected for rotation together by a casing 3 wherein are provided leak-off nozzles one of which is shown at 4, the rotors 1 and 2 being drivably connected to a sleeve shaft 5 integral with a first ahead pinion 6. Between the rotors 1 and 2 is located a pair of vaned rotors 7 and 8 forming a back-to-back rotor structure, the rotor 7 being associated with the rotor 1 to define a first working circuit and the rotor 8 being associated with the rotor 2 to form a second working circuit. The rotor structure comprising the rotors 7 and 8 is mounted on a quill shaft 9 which constitutes a first ahead countershaft and which extends through the sleeve shaft 5 and carries an input gearwheel 10 meshing with a high speed pinion 11 on a primary shaft 12 coupled to the shaft 13 of the turbine (not shown).

The high speed pinion 11 also meshes with a gearwheel 14 on a second ahead countershaft 15, which can be clutched to a second ahead pinion 16. The ahead pinions 6 and 16 mesh with an output gearwheel 17 on a shaft 18 coupled ot the propeller shaft (not shown).

An anti-backturning clutch 19, preferably of the synchronous self-shifting type having a fixed abutment is mounted on an extension of the high speed pinion shaft 12, whereby to prevent reverse rotation of the turbine, e.g. when at idling power, due to the negative torque of the overrunning propeller transmitted through the astern or ahead gear train, as the case may be, which negative torque may arise from motion of the vessel through the water.

A multiple toothed clutch 20 is provided between the shaft 9 and the shaft 5 on which pinion 6 is mounted, and a synchronous self-shifting clutch 21 with a locking control sleeve is provided between the shaft 15 and a shaft 15a on which pinion 16 is mounted, whereby the ahead pinions 6 and 16 can be clutched when required to the countershafts 9 and 15 respectively. The clutch 20 and the locking sleeve of the clutch 21 are arranged for engagement and disengagement conjointly by means of a fluid pressure actuated servo motor 22, the clutches 20 and 21 being disengaged when manoeuvring, i.e. when the ahead and astern turbo couplings are selectively filled/ emptied as required, and being in engagement during normal ahead propulsion when the two turbo couplings are empty.

When, during normal ahead propulsion the clutches 20 and 21 are in the engaged condition, the drive from the turbine to the propeller is via the locked train gearing then constituted by the pinion 11, gearwheels 10 and 14, shafts 9 and 15, clutches 20 and 21, pinions 6 and 16 and gearwheel 17.

The turbo coupling B in the astern gear train is of similar construction to the turbo coupling A in the ahead gear train, and has its casing 23 drivably connected to a sleeve shaft 24 integral with a reverse drive pinion 25 meshing with the output gearwheel 17, and having its rotor structure carried by a quill shaft 26 that passes through the sleeve shaft 24 and carries a reverse drive gearwheel 27 meshing with the gearwheel 14, the turbo couplings thus being geared for rotation of their input elements, viz their rotor structures, in opposite directions, whereas their output elements, viz their casings 3 and 23 and the associated vaned rotors, are geared for rotation in the same direction.

An axial bore 28 formed in the quill shaft 9, and constituting the aforementioned duct communicates with the two working circuits of the ahead turbo coupling A via liquid transfer ducts 29 that extend through the rotor structure of the turbo coupling and open respectively into the pair of working circuits of the turbo coupling A adjacent the inner profile radius thereof. A plurality of transfer ducts such as the ducts 29 is provided for each of the working circuits, being spaced in the angular sense around the axis of the quill shaft 9, and adjacent the opening of each transfer duct 29 into the associated working circuit there is provided a liquid flow directing guide member 30.

Additionally, there are provided in the rotor structure a plurality of axial ducts 31 which are closely adjacent the quill shaft 9 and which communicate at their respective ends with annular spaces 32 and 33 located radially within the inner profile radius of the respective working circuits, the spaces 32 and 33 communicating with the respective working circuits via a plurality of liquid transfer ducts 34 opening into the working circuits closely adjacent the inner profile radius thereof, and provided with liquid flow directing members 35.

The annular spaces 33 communicate, via a chamber 36 and ports 37 in a fixed structure 38 with a space 39 in a casing 40 of a control valve 41. The valve 41 includes a piston rod 42 carrying valve pistons 43 and 44 which cooperate with openings 45 and 46 (the opening 45 being shown open in FIGURE 2 whereas the opening 46 is closed by the piston 44).

The valve casing 40 is formed with a liquid inlet opening 47 and a liquid outlet opening 48.

Similar axial ducts and liquid transfer ducts are provided for the turbo coupling B, which has a control valve 41', similar to the valve 41, operable by a piston rod 42'.

In operation, assuming that the vessel is being manoeuvred ahead, the working circuits of the ahead turbo coupling A are full of working liquid, with the valve 41 in the position shown in FIGURE 2, and the working circuits of turbo coupling B are empty, and the valve 41' in the position to connect the working circuits of turbo coupling B to the sump. Liquid is ejected from the working circuits of turbo coupling A through the leak-off nozzles 4 and the working circuits are replenished by liquid supplied to the inlet 47 of valve 41.

When it is desired to change to astern propulsion, the turbine power output is reduced and the piston rods 42 and 42' are actuated so as to connect the chamber 39 of valve 41 to the sump and to connect the corresponding chamber of valve 41' to the liquid supply. The consequent rapid filling of the working circuits of the astern turbo coupling A via its axial ducts and liquid transfer ducts causes torque to be transmitted through turbo coupling B, and the gearing interconnecting turbo couplings A and B, with simultaneous creation in the working circuits of the ahead turbo coupling A of back pressure such as to cause working liquid to be ejected from its working circuits via the liquid transfer ducts 29 and 34 and the axial ducts 28, 31 and 33.

Under the aforesaid conditions the direction of the vortex flow in the rotors 7 and 8 is radially inwards, hence the emptying action takes place primarily through the transfer ducts 29. On the other hand, when the turbine power is increased such as to reverse the direction of flow in the rotors 7 and 8 the emptying action takes place primarily through the transfer ducts 34.

After the transitory intermediate stage in which the ahead and astern turbo couplings A and B are both partially full, the torque transmitted through the astern turbo coupling B becomes progressively greater than the torque transmitted through the ahead turbo coupling A, such that the shaft 12 connected to the turbine may be stopped and its direction of rotation reversed, resulting from the continued ahead rotation of the propeller due to the movement of the vessel through the water. The anti-backturning clutch 19 prevents such reversal of rotation, and ensures that the ahead and astern turbo couplings A and B together develop a high stalling torque whilst both pairs of working circuits are partially filled with working liquid.

After a suitable time interval, during which the retardation of the propeller due to the continued braking action of the substantially stalled ahead and astern turbo couplings is effective in assisting to reduce the speed of the vessel, the turbine power output is increased and acts through the astern turbo coupling B to stop and reverse the rotation of the propeller, and during this period the emptying of the working circuits of the ahead turbo coupling A is completed.

When changing back from astern to ahead propulsion the valves 41 and 41' are actuated to cause the converse sequence of operations, the working circuits of the ahead turbo coupling A being filled primarily via the axial ducts 28 and the transfer ducts 29 with the assistance of centrifugal force therein and the radially outward direction of flow of the vortex ring of liquid in the rotors 7 and 8, with simultaneous emptying of the working circuits of the stern turbo coupling B.

FIGURE 3 illustrates modifications of the marine reversing gear shown in FIGURES 1 and 2 in relation to the internal construction of the ahead and astern turbo couplings (of which only the ahead turbo coupling A is shown) and the associated shafting and control valve. Parts that correspond to parts shown in FIGURES 1 and 2 have been given the same reference numerals as in those figures.

The working circuits of each turbo coupling are filled and emptied via ducts 50 and 51 located within the inner profile radius of the working circuits, the ducts 50 corresponding to the ducts 29 of FIGURE 2 and the ducts 51 corresponding to the ducts 34 of FIGURE 2. Flow guide members 52 are associated with the ducts 50, and flow guide members 53 are associated with the ducts 51. The transfer ducts 50 and 51 communicate with axial ducts, one of which is shown at 54, external to and closely adjacent the quill shaft 9, the ducts 54 communicating with a chamber 55 which can be put selectively in communication with a liquid supply source or a sump via a piston control valve 56 operable by a piston rod 57 and having an inlet opening 58 and an outlet opening 59. The control valve 56 is offset laterally from the quill shaft 9 to enable this shaft to be extended, as indicated at 60, and provided with a flange 61 for connection to a cruising turbine or engine, e.g. a diesel engine.

I claim:

1. A hydraulic turbo coupling of the type comprising at least one pair of vaned rotors that define a working circuit wherein during normal operation of the turbo coupling working liquid in the form of a vortex ring transmits power from one rotor to the other, the improvement including at least one filling/emptying duct opening into an intervane space of one of said rotors in a region closely adjacent the inner profile radius of said working circuit, at least one other filling/emptying duct opening into an intervane space of the other of said rotors in a region closely adjacent the inner profile radius of said working circuit, and valve means operable to connect both said ducts selectively to a source of working liquid whereby to supply liquid to said working circuit via said ducts or to connect both said ducts to exhaust whereby to enable said working circuit to empty by reversal of flow through the respective duct in one of said rotors or in the other of said rotors when under working conditions of speed and torque creating sufficient pressure within the afore-mentioned region of said working circuit to effect said reversal of flow.

2. A hydraulic turbo coupling according to claim 1 including individual flow directing means associated with each of said ducts to assist reversal of flow through said ducts for directing liquid from said working circuit towards said ducts under the said working conditions.

3. A hydraulic turbo coupling according to claim 1 formed to provide a plurality of filling/emptying ducts opening into at least some of the intervane spaces of each of said rotors, and individual flow directing means associated with each of said ducts for directing liquid from said working circuit towards said ducts to assist reversal of flow through said ducts under the said working conditions.

4. A hydraulic turbo coupling of the type comprising at least one pair of vaned rotors that define a working circuit wherein during normal operation of the turbo coupling working liquid in the form of a vortex ring transmits power from one of said rotors to the other, the improvement including the formation of the turbo coupling to provide in at least one of said rotors at least one filling/emptying duct which at one end opens into said working circuit in a region closely adjacent the inner profile radius of said working circuit and the other end of which is external of said working circuit, and valve means operatively associated with said other end of said duct and volitionally operable selectively to connect the said other end of said duct selectively to a source of working liquid whereby to supply working liquid to said working circuit through said duct or to connect the said other end of said duct to exhaust whereby to enable said working circuit to empty by reversal of flow through said duct when the turbo coupling is under working conditions of speed and torque creating sufficient pressure within the aforementioned region of said working circuit to effect said reversal of flow.

5. A hydraulic turbo coupling according to claim 4 including flow directing means for directing liquid from said working circuit towards said duct to assist said reversal of flow through said duct under the said working conditions.

6. A hydraulic turbo coupling of the type comprising at least one pair of vaned rotors that define a working circuit wherein during normal operation of the turbo coupling working liquid in the form of a vortex ring transmits power from one of said rotors to the other, the improvement including the formation of at least one of said rotors to provide a plurality of filling/emptying ducts each of which opens at one end into said working circuit in a region closely adjacent the inner profile radius of said working circuit and the other end of which is external of said working circuit, and valve means operatively associated with the said other end of each of said ducts and volitionally operable selectively to connect the said other ends of said ducts all to a source of working liquid whereby to supply working liquid to said working circuit through said ducts or to connect the said other ends of said ducts all to exhaust whereby to enable said working circuit to empty by reversal of flow through said ducts when the turbo coupling is under working conditions of speed and torque creating sufficient pressure within the aforementioned region of said working circuit to effect said reversal of flow.

7. A hydraulic turbo coupling of the type comprising at least one pair of vaned rotors that define a working circuit wherein during normal operation of the turbo coupling working liquid in the form of a vortex ring transmits power from one of said rotors to the other, the improvement including the formation of at least one of said rotors to provide a plurality of filling/emptying ducts each of which opens at one end into said working circuit in a region closely adjacent the inner profile radius of said working circuit and the other end of which is external of said working circuit, and valve means operatively associated with the said other end of each of said ducts and volitionally operable selectively to connect the said other ends of said ducts all to a source of working liquid whereby to supply working liquid to said working circuit through said ducts or to connect the said other ends of said ducts all to exhaust whereby to enable said working circuit to empty by reversal of flow through said ducts when the turbo coupling is under working conditions of speed and torque creating sufficient pressure within the aforementioned region of said working circuit to effect said reversal of flow, and individual flow directing means associated with each of said ducts for directing working liquid from said working circuit towards said ducts to assist said reversal of flow through said ducts under the said working conditions.

8. A hydraulic turbo coupling of the type comprising at least one pair of vaned rotors that define a working circuit wherein during normal operation of the turbo coupling working liquid in the form of a vortex ring transmits power from one of said rotors to the other, the improvement including the formation of at least one of said rotors to provide a plurality of filling/emptying ducts each opening at one end into a respective one of at least the majority of the intervane spaces of said one rotor, and opening at the other end at the back of said rotor, and valve means operatively associated with the said other end of each duct, said valve means being volitionally operable selectively to connect the said other ends of said ducts to a source of working liquid whereby to supply working liquid to said working circuit through said ducts or to connect the said other ends of said ducts to exhaust whereby to enable said working circuit to empty by reversal of flow through said ducts when the turbo coupling is under working conditions of speed and torque creating sufficient pressure within the aforementioned region of said working circuit to effect said reversal of flow.

9. A hydraulic turbo coupling of the type comprising at least one pair of vaned rotors that define a working circuit wherein during normal operation of the turbo coupling working liquid in the form of a vortex ring transmits power from one of said rotors to the other, the improvement including the formation of at least one of said rotors to provide a plurality of filling/emptying ducts each opening at one end into a respective one of at least the majority of the intervane spaces of said one rotor, and opening at the other end at the back of said rotor, and valve means operatively associated with the said other end of each duct, said valve means being volitionally operable selectively to connect the said other ends of said ducts to a source of working liquid whereby to supply working liquid to said working circuit through said ducts or to connect the said other ends of said ducts to exhaust whereby to enable said working circuit to empty by reversal of flow through said ducts when the turbo coupling is under working conditions of speed and torque creating sufficient pressure within the aforementioned region of said working circuit to effect said reversal of flow, and individual flow directing means associated with each of said ducts for directing working liquid from said working circuit towards said ducts to assist said reversal of flow through said ducts under the said working conditions.

10. A hydraulic turbo coupling of the type comprising a first pair of vaned rotors forming a back-to-back rotor structure, a second pair of vaned rotors, means interconnecting said second pair of rotors for rotation together, said second pair of rotors being associated one with each of said first pair of rotors to define first and second working circuits, the improvement comprising the formation of each of said rotors to provide a plurality of openings therein constituting emptying/filling ducts opening each said working circuit in a region closely adjacent the inner profile radius of each said working circuit, and valve means operatively associated with said openings, said valve means being volitionally operable selectively to connect all said openings to a source of working liquid whereby to supply working liquid to both said working circuits through said openings or to connect all said openings to exhaust whereby to enable both said working circuits to empty by reversal of flow through said ducts when the turbo coupling is under working conditions creating sufficient pressure within the aforementioned region of each said working circuit to effect said reversal of flow.

11. A hydraulic turbo coupling according to claim 10 including individual flow directing means associated with each of said ducts for directing working liquid from said working circuits towards said ducts to assist said reversal of flow through said ducts under the said working conditions.

12. Marine reversing gear incorporating ahead and astern power paths, at least one hydraulic turbo coupling according to claim 4 in said ahead power path, and at least one hydraulic turbo coupling according to claim 4 in said astern power path.

References Cited

UNITED STATES PATENTS

| | | | |
|---|---|---|---|
| 2,104,213 | 1/1938 | Umlauf | 60—54 |
| 2,179,518 | 11/1939 | Popper | 60—54 |
| 2,487,250 | 11/1949 | La Brie | 60—54 |
| 2,625,014 | 1/1953 | Wolf | 60—54 |
| 2,950,632 | 8/1960 | Miller | 60—54 XR |
| 3,055,169 | 9/1962 | Seibold et al. | 60—54 XR |
| 3,180,095 | 4/1965 | Schneider | 60—54 |
| 2,917,899 | 12/1959 | Kollmann et al. | 60—54 |
| 3,173,260 | 3/1965 | Kugel | 60—54 |

EDGAR W. GEOGHEGAN, Primary Examiner

U.S. Cl. X.R.

192—58